(12) United States Patent
Young

(10) Patent No.: US 7,602,997 B2
(45) Date of Patent: Oct. 13, 2009

(54) METHOD OF SUPER-RESOLVING IMAGES

(75) Inventor: Shiqiong Susan Young, Bethesda, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 713 days.

(21) Appl. No.: 11/038,401

(22) Filed: Jan. 19, 2005

(65) Prior Publication Data

US 2006/0159369 A1 Jul. 20, 2006

(51) Int. Cl.
*G06K 9/32* (2006.01)

(52) U.S. Cl. .................... 382/299; 382/280
(58) Field of Classification Search .......... 382/321, 382/299, 280
See application file for complete search history.

(56) References Cited

U.S. PATENT DOCUMENTS

| | | | |
|---|---|---|---|
| 5,767,987 | A | 6/1998 | Wolff et al. |
| 6,023,535 | A | 2/2000 | Aoki |
| 6,157,732 | A | 12/2000 | Drisko et al. |
| 6,208,765 | B1 | 3/2001 | Bergen |
| 6,285,804 | B1 | 9/2001 | Crinon et al. |
| 6,344,893 | B1 | 2/2002 | Mendlovic et al. |
| 6,349,154 | B1 | 2/2002 | Kleihorst |
| 6,424,749 | B1 | 7/2002 | Zhu et al. |
| 6,483,952 | B2 | 11/2002 | Gregory et al. |
| 6,628,845 | B1 | 9/2003 | Stone et al. |
| 6,642,497 | B1 | 11/2003 | Apostolopoulos et al. |
| 6,650,704 | B1 | 11/2003 | Carlson et al. |
| 7,106,914 | B2* | 9/2006 | Tipping et al. ........ 382/299 |
| 2004/0239885 | A1* | 12/2004 | Jaynes et al. ........ 353/30 |
| 2006/0053455 | A1 | 3/2006 | Mani et al. |
| 2006/0279585 | A1* | 12/2006 | Milanfar et al. ........ 345/694 |
| 2007/0130095 | A1* | 6/2007 | Peot et al. ........ 706/20 |
| 2007/0206678 | A1* | 9/2007 | Kondo ........ 375/240.17 |

OTHER PUBLICATIONS

S.S. Young, "Alias-free Image Subsampling Using Fourier-based Windowing Method," Optical Engineering, 43(4), 843-855, Apr. 2004.

(Continued)

*Primary Examiner*—Aaron W Carter
(74) *Attorney, Agent, or Firm*—Stephen M. Bloor; Lawrence E. Anderson

(57) ABSTRACT

This invention presents a super-resolution image reconstruction from a sequence of aliased imagery. The sub-pixel shifts (displacement) among the images are unknown due to uncontrolled natural jitter of the imager. A correlation method is utilized to estimate sub-pixel shifts between each low resolution aliased image with respect to a reference image. An error-energy reduction algorithm is derived to reconstruct the high-resolution alias-free output image. The main feature of this proposed error-energy reduction algorithm is that we treat the spatial samples from low-resolution images that possess unknown and irregular (uncontrolled) sub-pixel shifts as a set of constraints to populate an over-sampled (sampled above the desired output bandwidth) processing array. The estimated sub-pixel locations of these samples and their values constitute a spatial domain constraint. Furthermore, the bandwidth of the alias-free image (or the sensor imposed bandwidth) is the criterion used as a spatial frequency domain constraint on the over-sampled processing array.

20 Claims, 16 Drawing Sheets

OTHER PUBLICATIONS

M. Irani and S. Peleg, "Improving Resolution by Image Registration," CVGIP: Graphical Models and Image Processing, vol. 53, pp. 231-239, May 1991.

R. C. Hardie, K.J. Barnard, and E. E. Armstrong, "Joint MAP registration and high-resolution image estimation using a sequence of undersampled images," IEEE Trans. Image Processing, vol. 6, pp. 1621-1633, Dec. 1997.

A. Papoulis, Chapter 14, Probability Random Variables, and Stochastic Processes, McGraw-Hill Book Company Inc., New York, 1984.

H. Stark and P. Oskoui, "High-resolution image recovery from image-plane arrays, using convex projections," J. Opt. Soc. Am. A, vol. 6, No. 11, pp. 1715-1726, Nov. 1989.

R. W. Gerchberg, "Super-resolution through error energy reduction," Optica Acta, vol. 21, 1974.

S. Foucher, G. B. Benie, and J. M. Boucher, "Multiscale MAP filtering of SAR images," IEEE Trans. Image Process. 10 (1), 49-60 (Jan. 2001).

B. J. Geiman, L. N. Bohs, M. E. Anderson, S. M. Breit, and G. E. Trahey, "A novel interpolation startegy for estimating subsample speckle motion," Phys. Med. Biol. 45(6), 1541-1552 (Jun. 2000).

R. Leptoukh, S. Ahmad, P. Eaton, M. Hegde, S. Kempler, J. Koziana, D. Ostrenga, D. Ouzounov, A. Savtchenko, G. Serafina, A. K. Sharma, and B. Zhou, "GES DAAC tools for accessing and visualizing MODIS data," Proc. Geosci. Remote Sens. Symp. IGARSS '02 6, 3202-3204 (2002).

B. E. Schmitz and R. L. Stevenson, "The enhancement of images containing subsampled chrominance information," IEEE Trans. Image Process. 6(7), 1052-1056 (1997).

A. Dumitras and F. Kossentini, "High-order image subsampling using feedforward artificial neural networks," IEEE Trans. Image Process. 10(3), 427-435 (2001).

A. Landmark, N. Wadstromer, and H. Li, "Hierarchical subsampling giving fractal regions," IEEE Trans. Image Process. 10(1), 167-173 (2001).

R. A. F. Belfor, M. P. A. Hesp, R. L. Lagendijk, and J. Biemond, "Spatially adaptive subsampling of image sequences," IEEE Trans. Image Process. 3(5), 492-500 (1994).

R.Y. Tsai and T.S. Huang, "Mulitple Frame Image Restoration and Registration," Advances in Computer Vision and Image Processing, Greenwich CT: JAI Press, Inc. 1984, pp. 317-339.

B.C. Tom and A.K. Katsaggelos, "Reconstruction of a High-resolution Image by Simultaneous Registration, Restoration, and Interpolation of Low-resolution Images," Proceedings of 1995 IEEE Int. Conf. Image Processing, col. 2, Washington, DC, Oct. 1995, pp. 539-542.

R.R. Schulz and R. L. Stevenson, "Extraction of high-resolution frames from video sequences," IEEE Trans. Image Processing, vol. 5, pp. 996-1011, Jun. 1996.

A. M. Guamieri, C. Prati, and F. Rocca, "SAR interferometric quicklook," Proc. Geosci. Remote Sens. Symp. IGARSS '93 3, 988-990 (1993).

J. O. Kim, B. T. Choi, A. Morales, and S. J. Ko, "Neural concurrent subsampling and interpolation for images," Proc. IEEE 2, 1327-1330 (1999).

J. R. Casas and L. Torres, "Morphological filter for lossless image subsampling," Proc. Int. Conf. Image Process. ICIP-94 2, 903-907 (1994).

* cited by examiner

METHOD OF SUPER-RESOLVING IMAGES

FIELD OF THE INVENTION

This invention relates in general to a method of digital image processing, and more specifically relates to a method for super-resolving images utilizing a sequence of undersampled low resolution images from the same scene with sub-pixel shifts among the images to reconstruct an alias-free high-resolution image, or to produce a sequence of such alias-free high-resolution frames as in a video sequence.

BACKGROUND OF THE INVENTION

Many low-cost sensors may spatially or electronically undersample an image. This results in an aliased image in which the high frequency components are folded into the low frequency components in the image. Consequently, subtle/detail information (high frequency components) are lost in these images. An image/signal processing method, called super-resolution image reconstruction, can increase image resolution without changing the design of the optics and the detectors. In other words, super-resolution image reconstruction can produce high-resolution images by using the existing low-cost imaging devices from a sequence (or a few snapshots) of low resolution images. The emphasis of the super-resolution image reconstruction algorithm is to de-alias the undersampled images to obtain an alias-free or, as identified in the literature, a super-resolved image.

When undersampled images have sub-pixel shifts between successive frames, they represent different information from the same scene. Therefore, the information that is contained in all undersampled images can be combined to obtain an alias-free (high-resolution) image. Super-resolution image reconstruction from multiple snapshots provides far more detail information than any interpolated image from a single snapshot.

There are three major steps in super-resolution image reconstruction methods. They are:

A) Acquiring a sequence of images from the same scene with sub-pixel shifts (fraction pixel displacements) among the images;

B) Estimating the sub-pixel (fraction pixel) shift or displacements among the images and C) Reconstructing the high-resolution image.

In the first step, there are two types of methods used to acquire low resolution images with sub-pixel shifts among them. One method is to have a controlled pixel displacement (see: (1) U.S. Pat. No. 6,642,497, "System for improving image resolution via sensor rotation," Nov. 4, 2003, J. Apostolopoulos and F. Kitson; (2) U.S. Pat. No. 6,344,893, "Super-resolving imaging system," Feb. 5, 2002, D. Mendlovic et. al.; (3) U.S. Pat. No. 6,483,952, "Super resolution methods for electro-optical systems," Nov. 19, 2002, D. D. Gregory et. al.). In this method, a special sensor or scanner (hardware) is designed to capture multiple images in a known pattern, where each image is captured by displacing the sensor in a known distance that is not a multiple of a pixel, but rather is a multiple of a pixel plus a known fraction of a pixel. Another method is to have a non-controlled pixel displacement, e.g. natural jitter. This method is more cost effective and more practical. For example, an imager is carried by a moving platform in many applications. In a rescue mission, the camera may be carried by a helicopter, or a moving vehicle. In military reconnaissance situations, the camera may be carried by a person, an unmanned ground vehicle (UGV), or an unmanned aerial vehicle (UAV). Sub-pixel shifts need to be accurately estimated for natural jittering imagers.

The second step is to estimate the sub-pixel shift or fraction pixel displacements. There are many methods that are addressed in the literature. Frame-to-frame motion detection based on gradient decent methods are most used (see: (1) U.S. Pat. No. 5,767,987, "Method and apparatus for combining multiple image scans for enhanced resolution," Jun. 16, 1998, G. J. Wolff and R. J. Van Steenkiste; (2) U.S. Pat. No. 6,650,704, "Method of producing a high quality, high resolution image from a sequence of low quality, low resolution images that are undersampled and subject to jitter," Nov. 18, 2003, R. S. Carlson, J. L. Arnold, and V. G. Feldmus; (3) U.S. Pat. No. 6,285,804, "Resolution improvement from multiple images of a scene containing motion at fractional pixel values," Sep. 4, 2001, R. J. Crinon and M. I. Sezan; (4) U.S. Pat. No. 6,349,154, "Method and arrangement for creating a high-resolution still picture," Feb. 19, 2002, R. P. Kleihorst). One of the variations of these methods is to estimate the velocity vector field measurement based on spatio-temporal image derivative (see U.S. Pat. No. 6,023,535, "Methods and systems for reproducing a high resolution image from sample data," Feb. 8, 2000, S. Aoki). Most of these methods need to calculate matrix inversion or use iterative methods to calculate the motion vectors. Bergen (see U.S. Pat. No. 6,208,765, "method and apparatus for improving image resolution," Mar. 27, 2001, J. R. Bergen) teaches a method to use warp information to obtain sub-pixel displacement. Stone et al (see U.S. Pat. No. 6,628,845, "Method for subpixel registration of images," Sep. 30, 2003, H. S. Stone, M. T. Orchard, E-C Chang, and S. Martucci) teaches another method that is to estimate the phase difference between two images to obtain sub-pixel shifts. In this method, the minimum least square solution has to be obtained to find the linear Fourier phase relationship between two images.

The third step in super-resolution image reconstruction is to reconstruct the high-resolution image. Many methods have been proposed to solve the problem. These can be divided into two categories: directive non-uniform interpolation and non-directive inverse processing. Among directive interpolation methods, U.S. Pat. No. 5,767,987 teaches a method in which the reference image is interpolated to produce an image of higher density samples (mixels). Each of the remaining pixel image scans is aligned with the interpolated prototype. The mixel values of the prototype are iteratively adjusted by minimizing an error metric representing the difference between the pixel values computed from the prototype and the corresponding pixel values of each of the low resolution pixel image scans. Other directive interpolation methods are described using spatial interpolation at the inter-pixel position (see U.S. Pat. No. 6,285,804), using warping procedure (see U.S. Pat. No. 6,208,765), using weighted interpolation (see U.S. Pat. No. 6,023,535), and implementing the interpolation by convolving with a shifted-fractional kernel (polynomial kernel) (see U.S. Pat. No. 6,650,704).

In non-directive inverse processing methods, an observation model is formulated to relate the original high resolution image to the observed low resolution images. The solution of high resolution image is often solved by inverse matrix or iterative procedure. The observation model can be formulated in spatial domain or frequency domain. The corresponding inverse methods are implemented in both domains. For spatial domain inverse method, initial guess of a high resolution image is obtained first (see M. Irani and S. Peleg, "Improving resolution by image registration," CVGIP: Graphical Models and Image Processing, vol. 53, pp. 231-239, May 1991). Then an imaging formation processing is simulated to obtain a set of low resolution images. The differences between the simulated and original low resolution images are used to improve the initial guess of the high resolution image. In this method, the initial guess of the high resolution image is crucial to the algorithm convergence. For frequency domain inverse methods, the relationship between low-resolution images and the high resolution image is demonstrated in the frequency domain (see R. Y Tsai and T. S. Huang, "Multiple frame image restoration and registration," in Advances in Computer Vision and Image Processing, Greenwich, Conn.: JAI Press Inc., 1984, pp. 317-339), in which the relation between the continuous Fourier Transform (CFT) of an original high resolution image and the discrete Fourier Transform (DFT) of observed aliased low resolution images is formulated based on the shifting property of the Fourier transform.

When there is prior knowledge about the high resolution image and the statistical information of noise can be defined, the inverse processing method can provide stabilized (regularized) estimates. These methods are called regularized super-resolution approaches (see: (1) B.C. Tom and A. K. Katsaggelos, "Reconstruction of a high-resolution image by simultaneous registration, restoration, and interpolation of low-resolution images," Proc. of 1995 IEEE Int. Conf. Image Processing, vol. 2, Washington, DC, October 1995, pp. 539-542; (2) R. R. Schulz and R. L. Stevenson, "Extraction of high-resolution frames from video sequences," IEEE Trans. Image Processing, vol. 5, pp. 996-1011, June 1996; (3) R. C. Hardie, K. J. Barnard, and E. E. Armstrong, "Joint MAP registration and high-resolution image estimation using a sequence of undersampled images," IEEE Trans. Image Processing, vol. 6, pp. 1621-1633, December 1997).

In consideration of the problems detailed above and the discrepancies enumerated in the partial solutions thereto, an object of the present method is to produce high-resolution images by using a sequence of low-resolution images from existing low-cost imaging devices.

Another object of the present method is to produce high-resolution images for unknown sub-pixel shifts among the low-resolution images by estimating sub-pixel accuracy shifts (displacements).

Another object of the present method is to produce high-resolution images that eliminate alias from the low-resolution images.

In order to attain the objectives described above, according to an aspect of the present invention, there is provided a method of super-resolving images whereby super-resolution images are reconstructed from sequences of, typically lower resolution, aliased imagery.

SUMMARY OF THE INVENTION

The present invention provides a solution to these problems when there are unknown prior knowledge about the high resolution image and unknown (irregulated or uncontrolled) sub-pixel shifts among the low resolution images. According to a feature of the present invention, there is providing a method of super-resolving images comprising:

A) providing multiple low resolution input images from the same scene with unknown/known and irregular/regular sub-pixel shifts among images;

B) applying a gross shift estimation algorithm to the input low resolution images to obtain the overall shift of each image with respect to a reference image;

C) aligning the input images according to the gross shift estimates; applying a sub-pixel shift estimation algorithm to the aligned input images to obtain the sub-pixel shift of each image with respect to a reference image; and D) applying an error-energy reduction algorithm to the input low resolution images with the estimated sub-pixel shifts among images to produce a high-resolution (alias-free) output image.

The aforementioned features, objects, and advantages of this method over the prior art will become apparent to those skilled in the art from the following detailed description and accompanying drawings.

BRIEF DESCRIPTION OF THE DRAWINGS

The present invention can best be understood when reading the following specification with reference to the accompanying drawings, which are incorporated in and form a part of the specification, illustrate alternate embodiments of the present invention, and together with the description, serve to explain the principles of the invention. In the drawings.

DETAILED DESCRIPTION OF THE INVENTION

Figure 1A:
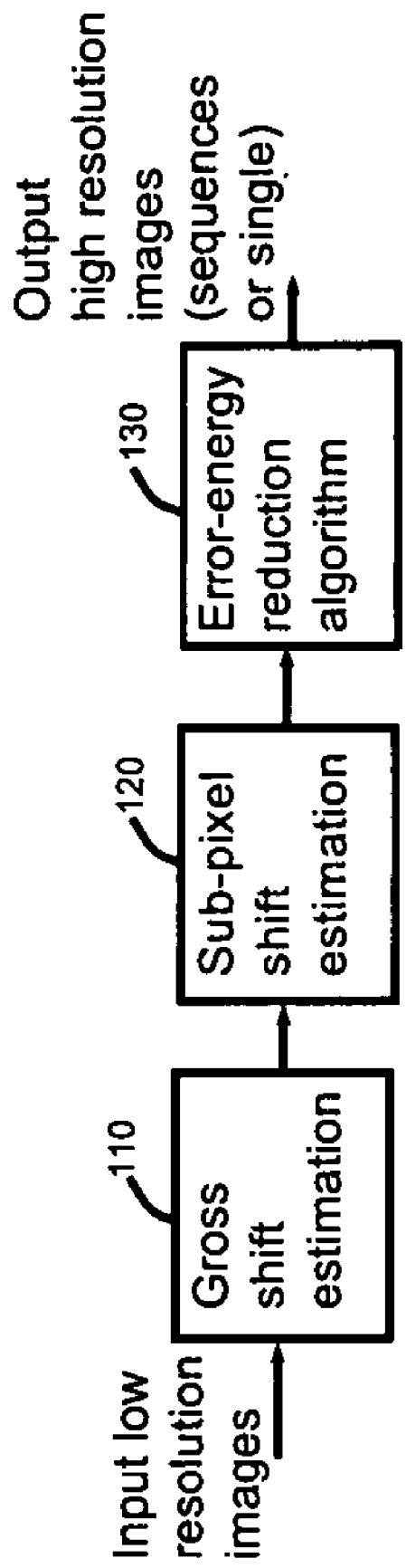
FIG. 1a is a block diagram of one embodiment of super-resolution image reconstruction in this invention.

An overview of the invention is illustrated in FIG. 1a. A sequence of original input low resolution images is passed into the gross shift estimation algorithm (box 110) to estimate the overall shift of each frame with respect to a reference frame. The undersampled low resolution images are captured either by natural jitter or some kind of controlled motion of the camera. The images of successive frames contain not only the sub-pixel shifts but also the integer pixel shifts.

Before estimating the sub-pixel shifts, the gross shifts among frames are compensated. After the gross-shifts are estimated, the input images are realigned. Then the sub-pixels shifts are estimated for each frame with respect to a reference frame (box 120). The error-energy reduction algorithm is applied to the input low resolution images with the estimated sub-pixel shifts among images to obtain the high-resolution (alias-free) output (box 130). The output is either a single high-resolution image that is generated from a sequence of low resolution images or a sequence of high-resolution images such as in a video sequence that are generated from multiple sequences of low resolution images.

Figure 1B:
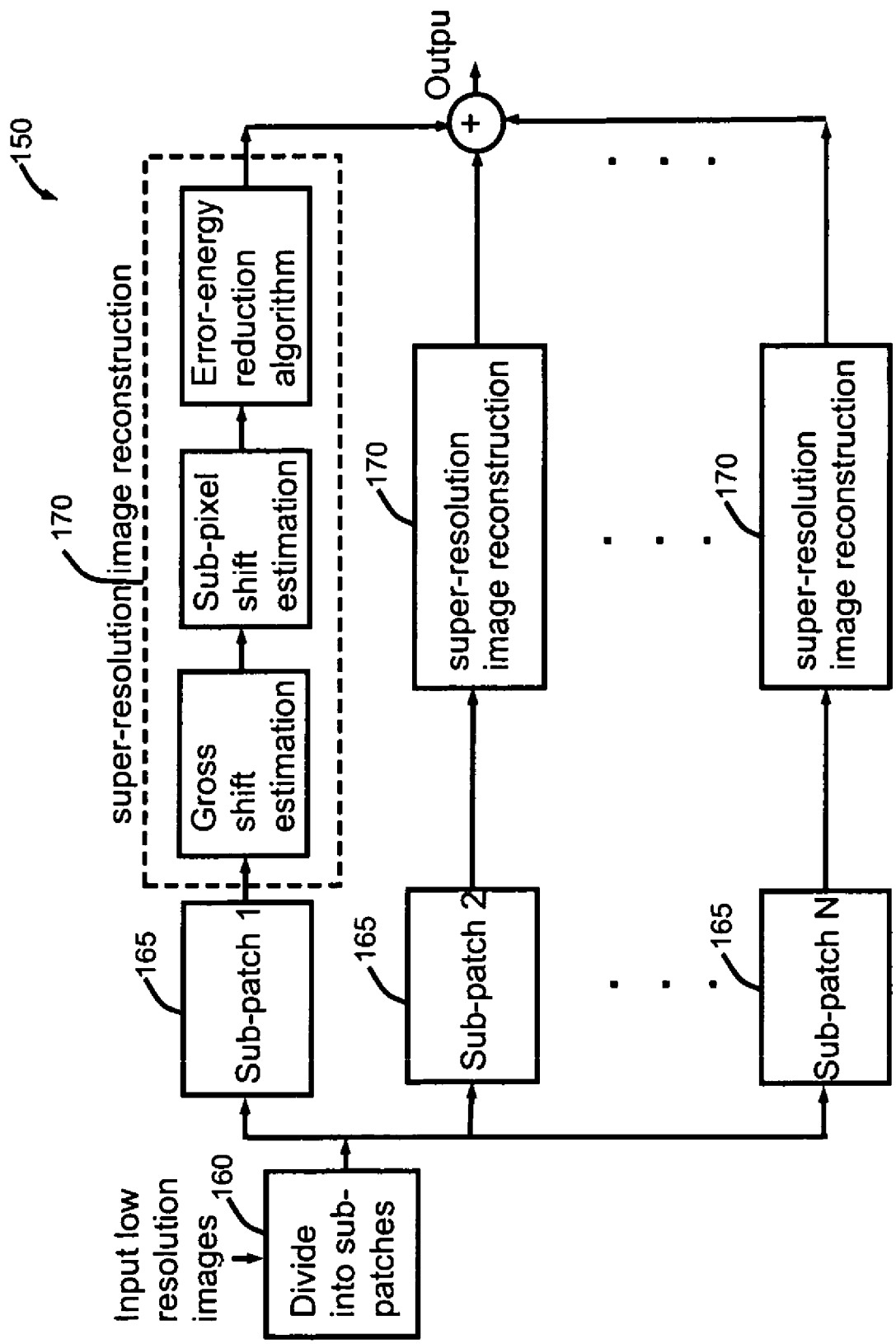
FIG. 1b is a block diagram of an alternative embodiment of this invention to minimize the warping effect in the input images.

FIG. 1b shows an alternative embodiment of this invention. Because the warping effect might exist in the image acquisition process, the shifts among frames are not consistent cross the image. The shifts in one region might be different from ones in another region.

In order to minimize the warping effect and estimate the shifts accurately, the input low resolution images are divided into small regions (sub-patches) (box 160) in the spatial domain.

Among the individual sub-patches (box 165), the super-resolution image reconstruction algorithm (box 170), including the gross shift estimation, the sub-pixel shift estimation, and the error-energy reduction algorithm, is applied to obtain the high-resolution (alias-free) sub-patch image. At the last step, all super-resolved sub-patches are combined to form the entire high-resolution output image.

The super-resolution image reconstruction algorithm comprises the following sections:
Gross Shift Estimation
Sub-Pixel Shift Estimation
Error-Energy Reduction Algorithm Gross Shift Estimation The shifts between two images are estimated using a correlation method to explore the translational differences (shifts in x and y domains) of Fourier transforms of two images. For notational simplicity, we first consider the problem in the one-dimensional spatial x domain. We denote two members of the image sequence by $f_1(x)$ and $f_2(x)$.

The second image is a shifted version of the first image, e.g., $$f_2(x)=f_1(x-x_s),$$

where $x_s$ is the relative shift (translational difference) between $f_1(x)$ and $f_2(x)$.

We denote their Fourier transforms by $F_1(k_x)$ and $F_2(k_x)$. Then, these two Fourier transforms are related by $$F_2(k_x)=F_1(k_x)e^{-jk_xx_s}.$$

The term, $e^{-jk_xx_s}$, is the phase difference between two Fourier transforms. The correlation between $F_1(k_x)$ and $F_2(k_x)$ is written in the following:

$$G_{12}(k_x)=F_2(k_x)\cdot F_1^*(k_x)=|F_1(k_x)|^2\cdot e^{-jk_xx_s},$$

where $F_1^*(k_x)$ is the conjugate of $F_1(k_x)$. The inverse Fourier transform of the correlation, $G_{12}(k_x)$, is denoted as $g_{12}(x)$. The function $g_{12}(x)$ has a peak at $x=x_s$.

Figure 2A:
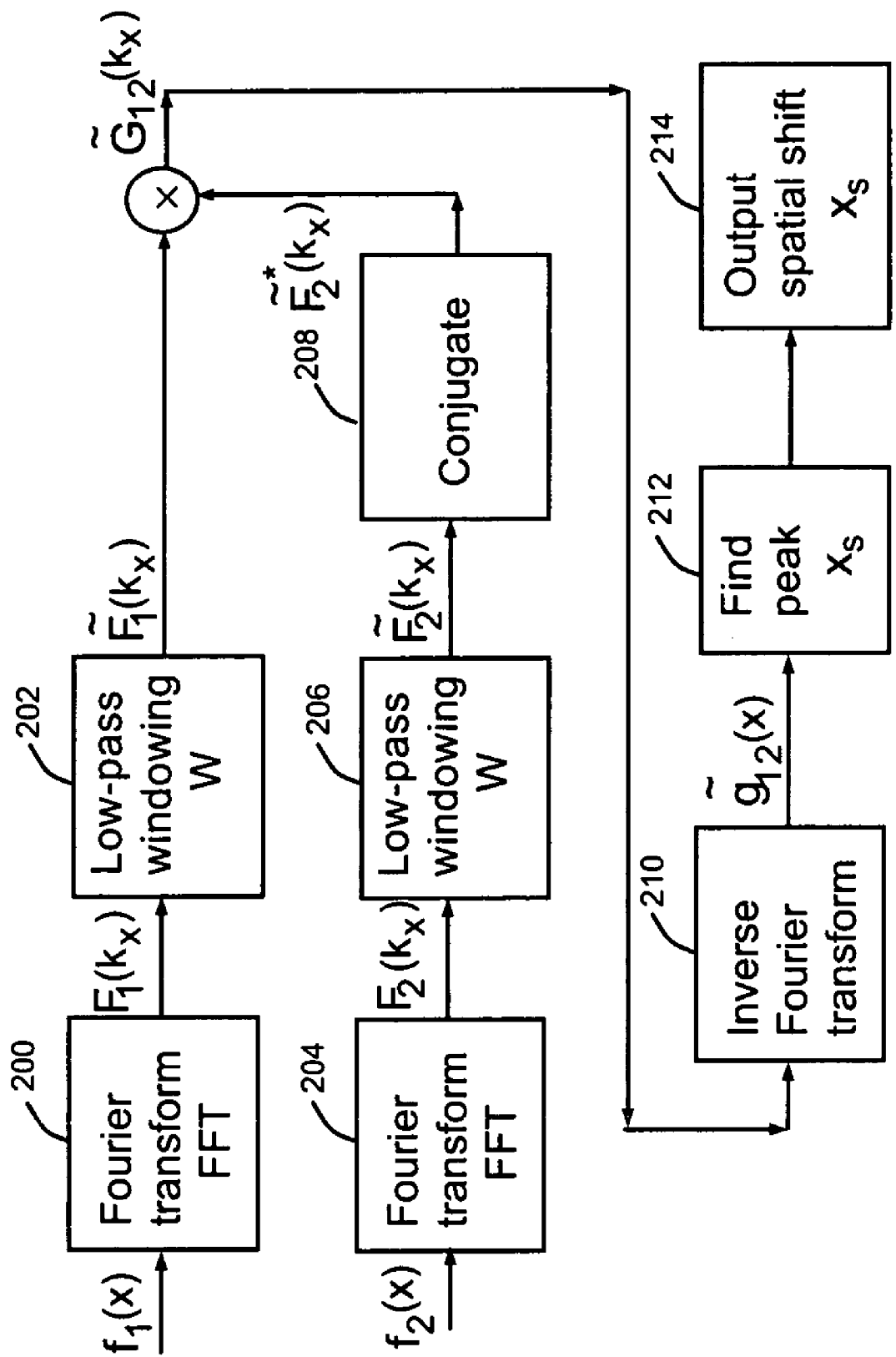
FIG. 2a is a block diagram of the gross shift estimation algorithm for one-dimensional signals.

However, both $f_1(x)$ and $f_2(x)$ are aliased, i.e., the high frequency components are folded into a portion of low frequency components. In general, for an aliased image, the image energy at lower frequency components is stronger than the folded high frequency components. Thus, the signal to aliasing power ratio is relatively high around $k_x \approx 0$. FIG. 2a is a diagram of the shift estimation for one-dimensional signals. A low-pass filtering (box 202 and box 206), $W(k_x)$, is applied to the Fourier transforms (box 200 and box 204) $F_1(k_x)$ and $F_2(k_x)$ to generate $\tilde{F}_1(k_x)$ and $\tilde{F}_2(k_x)$. That is, $$\tilde{F}_2(k_x)=F_2(k_x)\cdot W(k_x)$$

and $$\tilde{F}_1(k_x)=F_1(k_x)\cdot W(k_x)$$

Then the phase difference equation can be written in the following:

$$\tilde{F}_2(k_x)\approx\tilde{F}_1(k_x)e^{-jk_xx_s}.$$

The correlation (box 208) between $\tilde{F}_1(k_x)$ and $\tilde{F}_2(k_x)$ is written as $$\tilde{G}_{12}(k_x)=\tilde{F}_2(k_x)\cdot\tilde{F}_1^*(k_x)=|\tilde{F}_1(k_x)|^2\cdot e^{-jk_xx_s}. \quad (1)$$

The inverse Fourier transform (box 210) of the correlation, $\tilde{G}_{12}(k_x)$, is again denoted as $\tilde{g}_{12}(x)$. The shift $x_s$ (box 214) can be estimated by finding the peak of the function $\tilde{g}_{12}(x)$ (box 212).

Figure 2B:
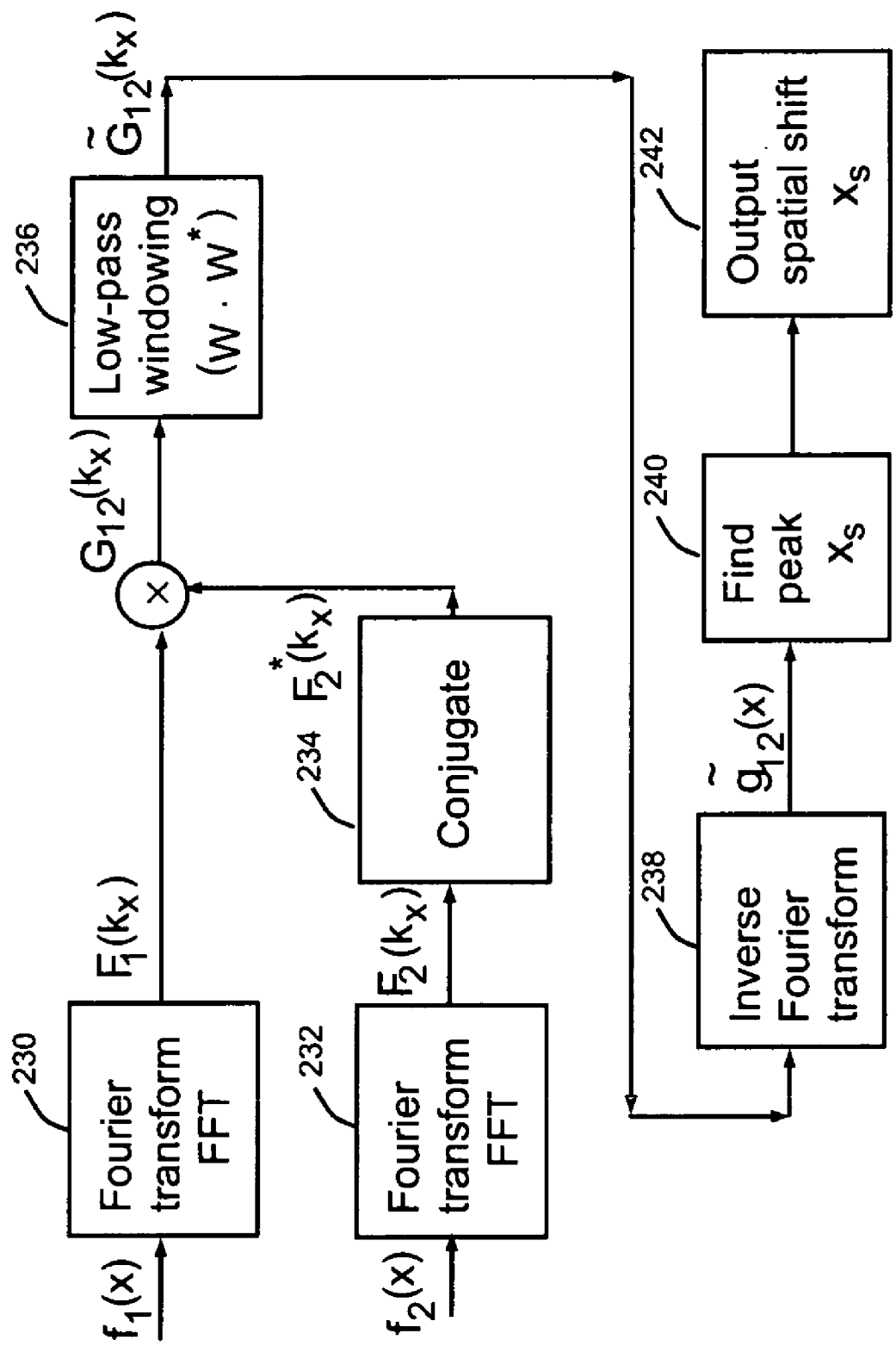
FIG. 2b is a block diagram of an alternative embodiment of the gross shift estimation algorithm for one-dimensional signals.

A computationally efficient implementation of this correlation method is illustrated in FIG. 2b. The correlation between two low-pass filtered functions $\tilde{F}_1(k_x)$ and $\tilde{F}_2(k_x)$ (box 230, box 232, box 234, and box 236) can also be written in the following:

$$\tilde{F}_2(k_x)\cdot\tilde{F}_1^*(k_x) = [F_2(k_x)\cdot W(k_x)]\cdot[F_1(k_x)\cdot W(k_x)]^*$$
$$= [F_2(k_x)\cdot F_1^*(k_x)]\cdot[W(k_x)\cdot W^*(k_x)].$$

This means that the correlation of two low-pass filtered images is equivalent to low-pass filtering the correlated two original images. (Note that W*=W since W is a real signal.)

We should also point out that the frequency domain operation in the equation (1) is equivalent to the following spatial domain convolution:

$$\tilde{g}_{12}(x)=f_2(x)\otimes f_1^*(-x).$$

Figure 2C:
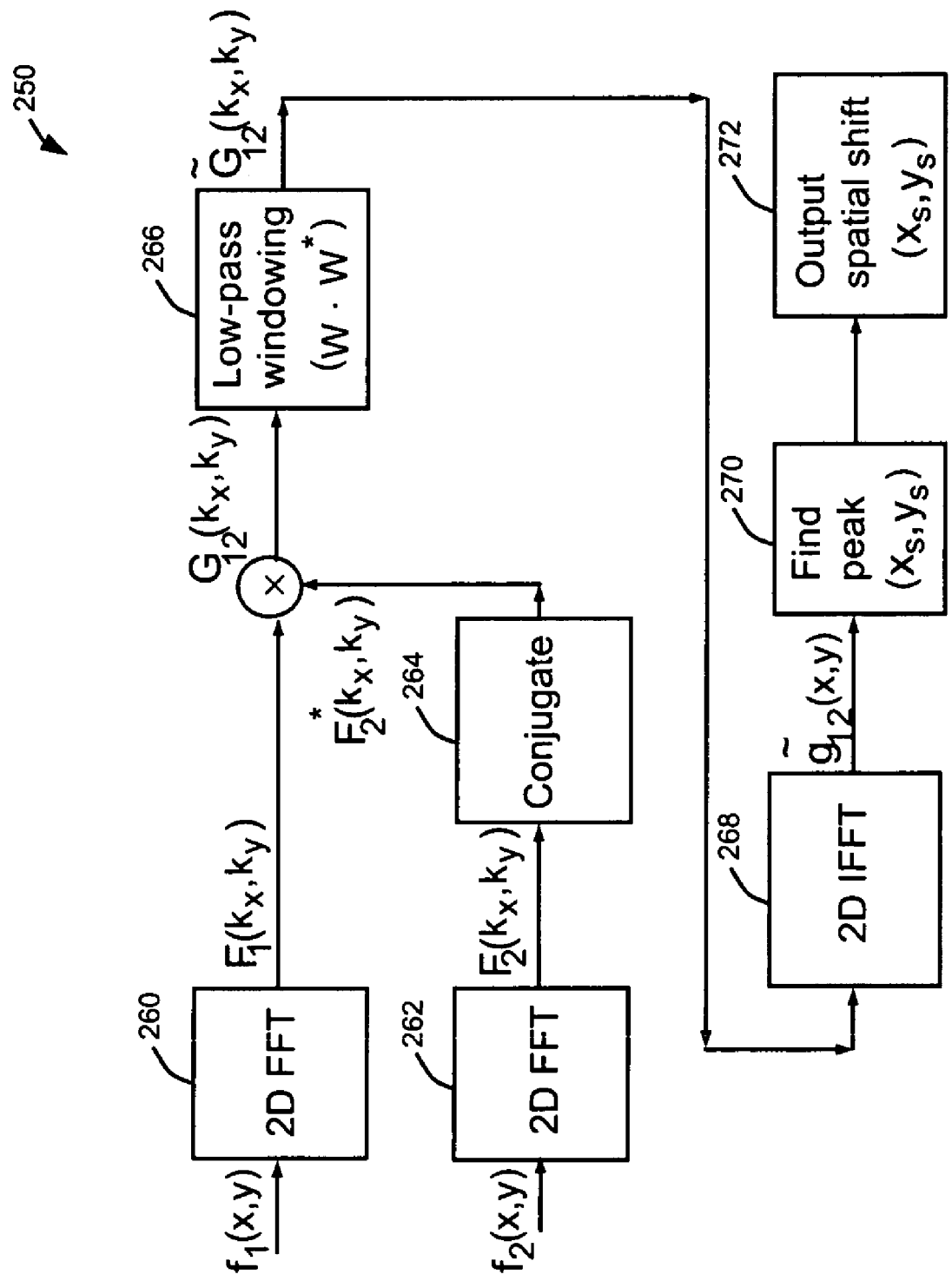
FIG. 2c is a block diagram of the gross shift estimation algorithm for two-dimensional images.

To avoid the circular convolution aliasing in the spatial domain, the original images $f_1(x)$ and $f_2(x)$ are zero-padded prior to the Fourier transforms. The extension of this shift estimation to a two-dimensional shift correlation method is straight forward (250) as shown in FIG. 2c.

Sub-Pixel Shift Estimation

Figure 3A:
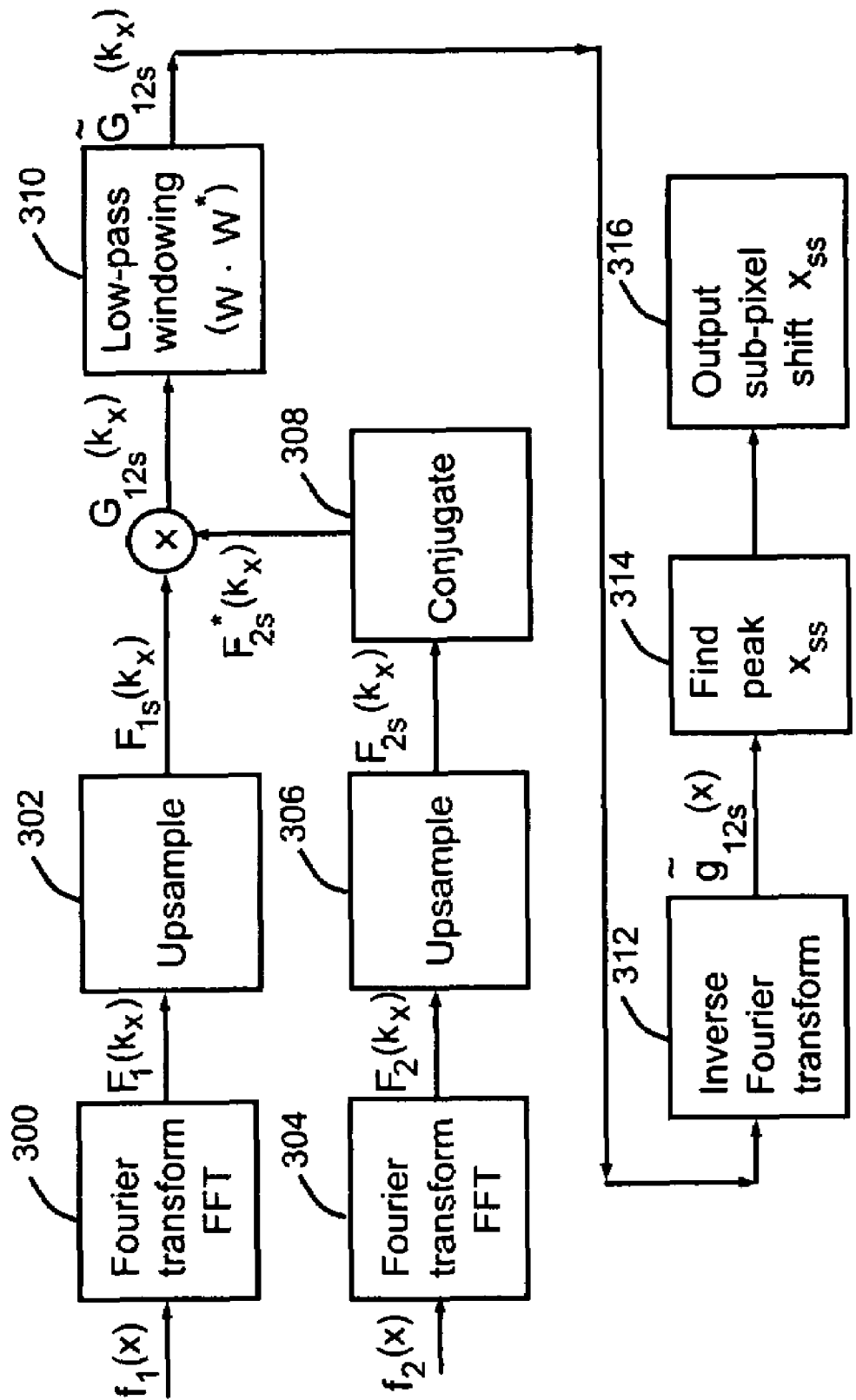
FIG. 3a is a block diagram of the sub-pixel shift estimation algorithm for one-dimensional signals.

FIG. 3a shows a diagram of the sub-pixel shift estimator for one-dimensional signals. The operation is identical to the gross shift estimation of the previous section. However, in order to achieve sub-pixel accuracy, the images are upsampled first (box 300, box 302, box 304, and box 306). The upsampling is obtained by a Fourier windowing method (see S. S. Young, "Alias-free image subsampling using Fourier-based windowing methods," *Optical Engineering*, 43(4), 843-855, April 2004). In this Fourier windowing method, the zero-padding with a window is applied to the Fourier transform of the input image to have an alias-free upsampled image. Then the correlation method (box 308) is applied to two upsampled Fourier transforms of two input images (box 310) to estimate the shifts in sub-pixel accuracy (box 312, box 314, and box 316).

Figure 3B:
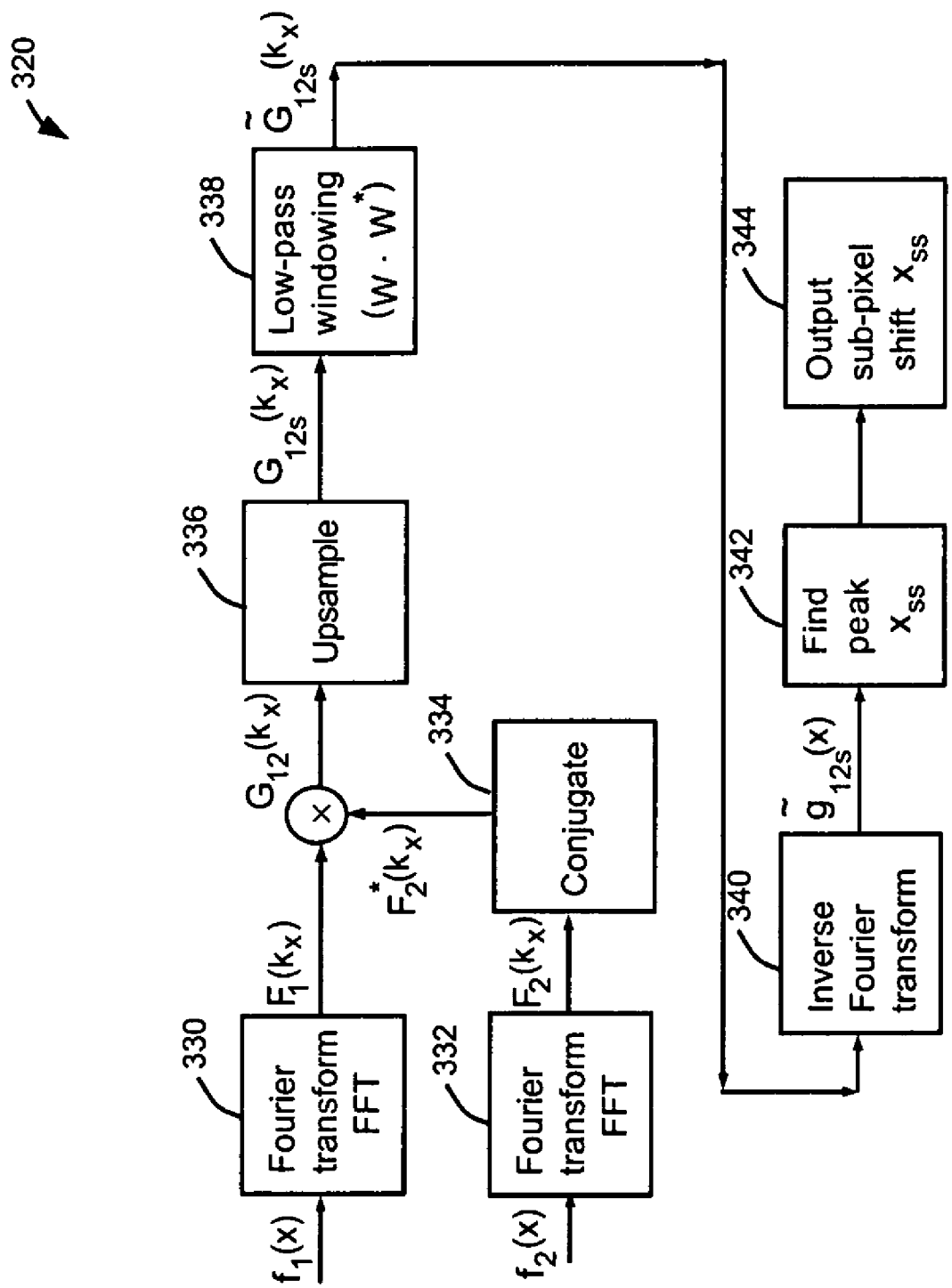
FIG. 3b is a block diagram of an alternative embodiment of the sub-pixel shift estimation algorithm for one-dimensional signals.
Figure 3C:
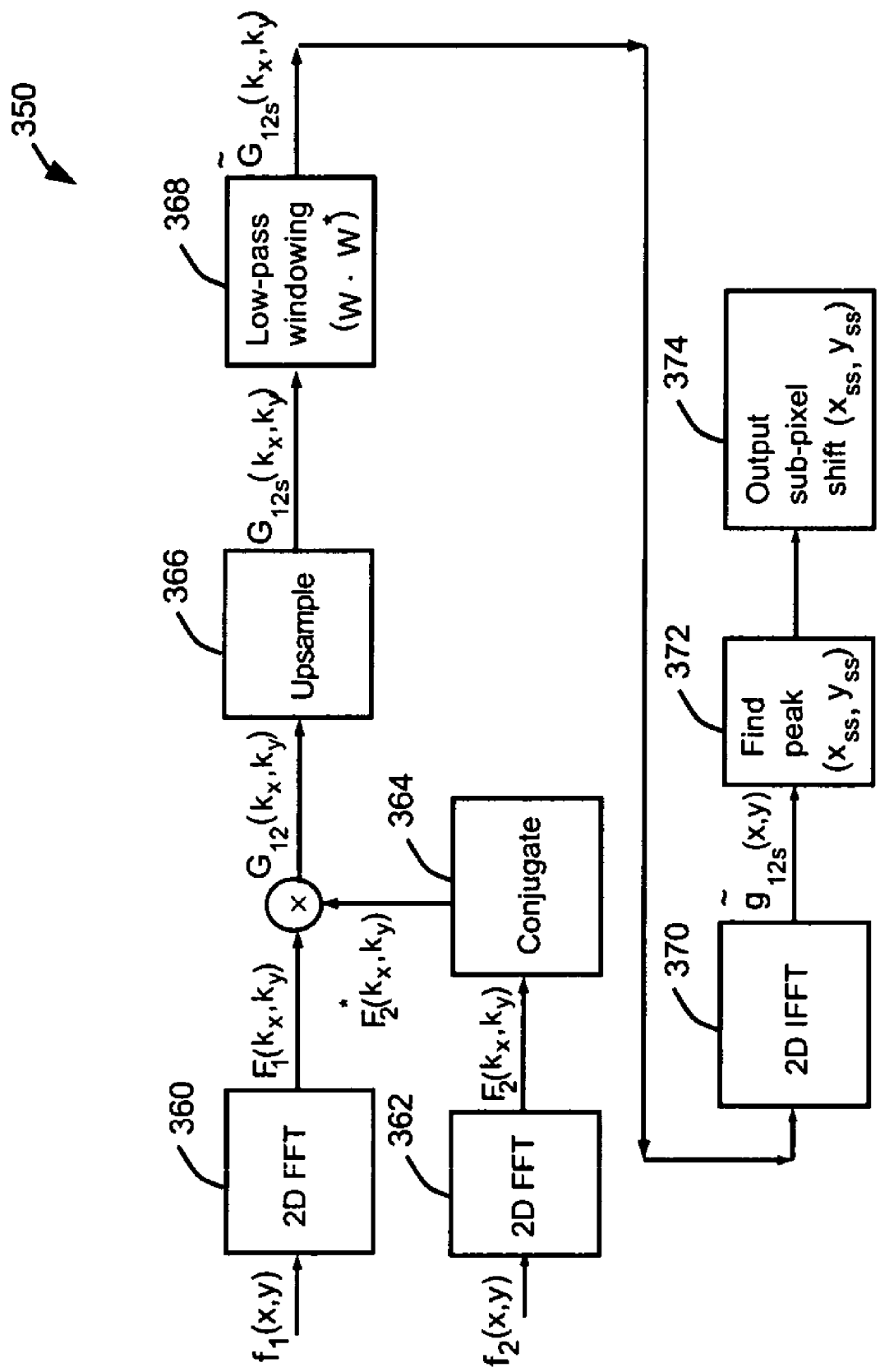
FIG. 3c is a block diagram of the sub-pixel shift estimation algorithm for two-dimensional images.

A computationally efficient implementation is illustrated in FIG. 3b as an alternative embodiment (320). Similarly, the correlation of two upsampled images is equivalent to upsampling (box 336) the correlated two original images (box 330, box 332, and box 334). The sub-pixel shift estimator for two-dimensional images is a straight forward extension from one-dimensional signals as shown in FIG. 3c (350).

Figure 4:
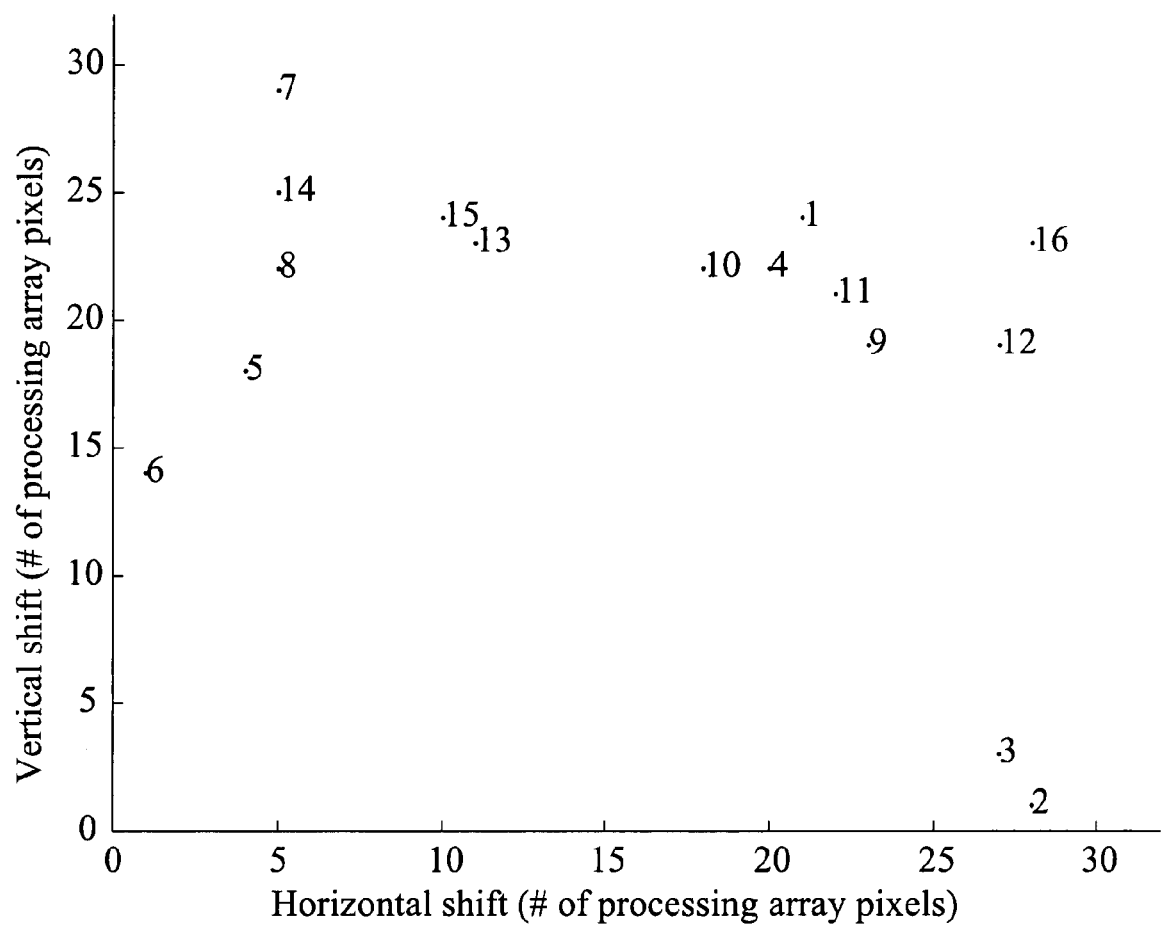
FIG. 4 is a graphic view showing an example of sub-pixel shift estimation from 16 frames. The numbers on the figure represent the names of frames. The sub-pixel shifts of each frame with respect to a reference frame are illustrated at their corresponding sub-pixel locations.

An example of sub-pixel shift estimation from 16 frames is shown in FIG. 4. The sub-pixel shift of each frame with respect to a reference frame is illustrated in the FIG. 4. From this figure, we can see that the sub-pixel shifts among frames are randomly distributed in both x and y domains. The sub-pixel motion among frames is not controlled in a fixed pattern in this example.

Error-Energy Reduction Algorithm

In error-energy reduction algorithm, the high-resolution image values are reconstructed by removing aliasing from low resolution images. The algorithm is based on the concept that the error-energy is reduced by imposing both spatial and spatial frequency domain constraints: samples from low-resolution images; bandwidth of the high-resolution alias-free output image. The error-energy reduction algorithm has been utilized in other signal processing applications. Some of the well known examples included the works by Papoulis (see A. Papoulis, Chapter 14, Probability Random Variables, and Stochastic Processes, McGraw-Hill Book Company Inc., New York, 1984, $2^{nd}$ Edition.), Gerchberg (see R. W. Gerchberg, "Super-resolution through error energy reduction," Optica Acta, vol. 21, 1974.), and Stark et al. (see H. Stark and P. Oskoui, "High-resolution image recovery from image-plane arrays, using convex projections," J. Opt. Soc. Am. A, vol. 6, no. 11, pp.1715-1726, November 1989). Papoulis utilized the available information both in spatial and frequency domains to extrapolate the distribution of auto-correlation for spectral estimation. In Gerchberg's work, in order to achieve resolution beyond the diffraction limit, the spectrum of the reconstructed object is enhanced (expended) by reducing the energy of the error spectrum from one snap-shot (not a sequence). In the work by Stark and his associates, they described the projection onto convex sets (POCS) approach to incorporate the spatial observation model from controlled rotation or scan into the reconstruction processing to achieve high resolution based on imposing spatial domain constraints.

The main feature of this invention is that we treat the spatial samples from low resolution images that posses unknown and irregular (uncontrolled) sub-pixel shifts as a set of constraints to populate an over-sampled (sampled above the desired output bandwidth) processing array. The estimated sub-pixel locations of these samples and their values constitute a spatial domain constraint. Furthermore, the bandwidth of the alias-free image (or the sensor imposed bandwidth) is the criterion used as a spatial frequency domain constraint on the over-sampled processing array. One may also incorporate other spatial or spatial frequency domain constraints that have been used by others; e.g., positivity of the image in the spatial domain. (This constraint is similar to the amplitude constraint that was used by Stark.)

Image acquisition model

Figure 5A:
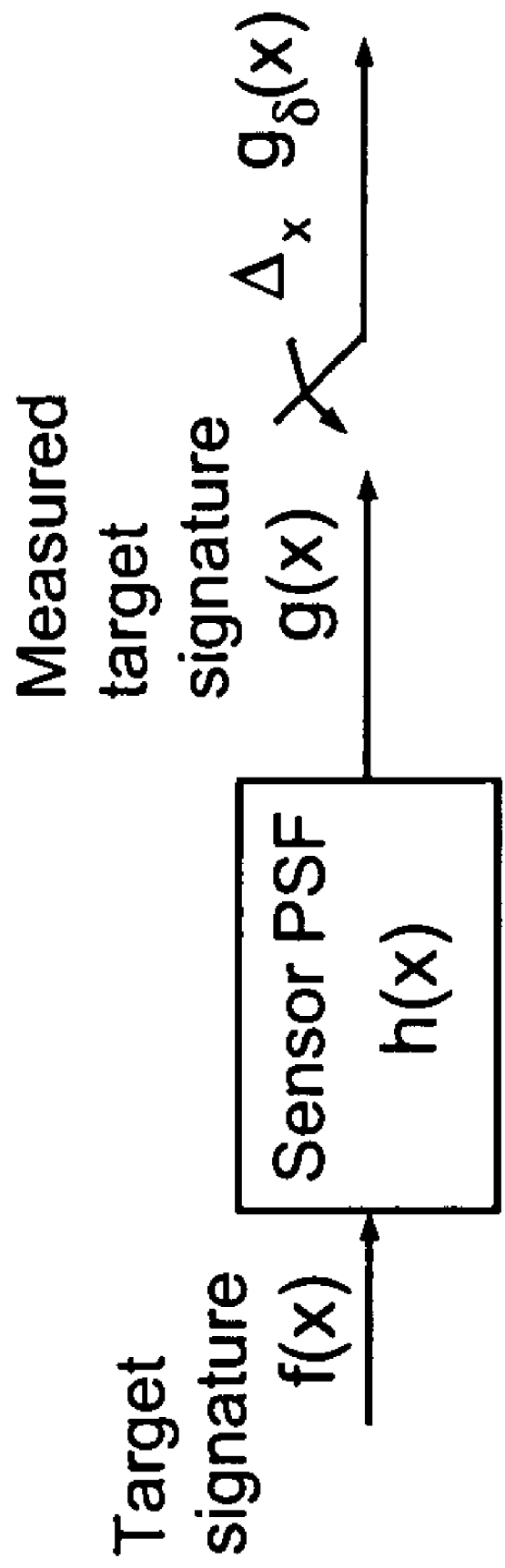
FIG. 5a is a graphic view showing the image acquisition model.

FIG. 5a shows the system model for acquiring an undersampled image in a one-dimensional case. Let f(x) be the ideal target signature that is interrogated by the sensor. The measured target signature g(x) by the sensor is modeled as the output of a Linear Shift Invariant (LSI) system whose impulse response is the sensor's point spread function (PSF), h(x); this is also known as the sensor blurring function. The relationship between the measured target signature and the original target signature in the spatial frequency $k_x$ domain is:

$$G(k_x)=F(k_x)H(k_x)$$

where $G(k_x)$, $F(k_x)$, and $H(k_x)$ are the Fourier transforms of g(x), f(x), and h(x), respectively.

Figure 5B:
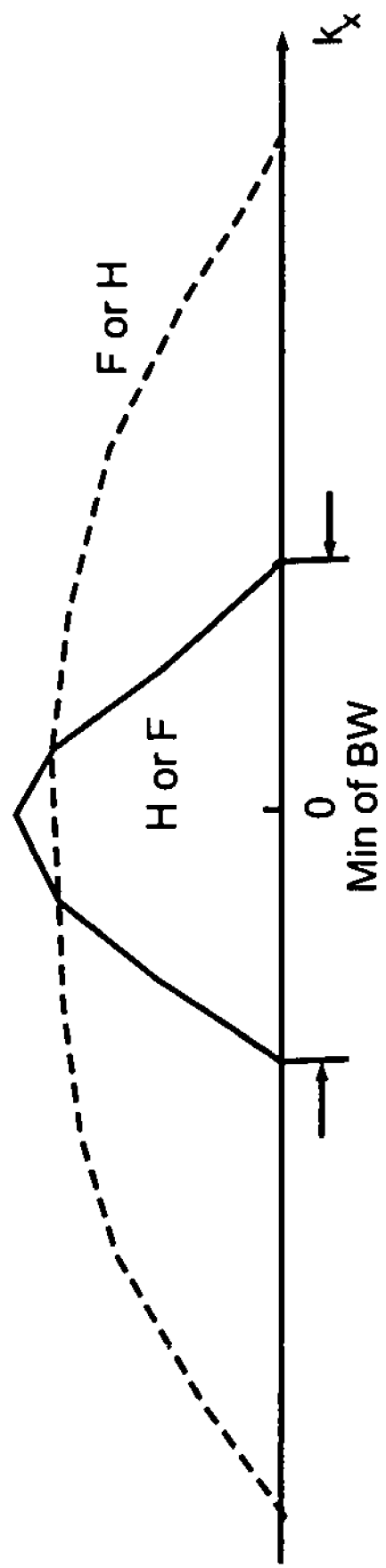
FIG. 5b is a graphic view showing the factors that dictate the bandwidth of the measured target signature.

FIG. 5b shows the factors that dictate the bandwidth of the measured target signature. The bandwidth of the sensor's PSF is fixed and is determined by the support of the transfer function $H(k_x)$. The bandwidth of the ideal target signature depends on, e.g., the range of the target in FLIR (Forward-Looking Infrared), radar, sonar, visible light, etc. For a target at the short range, more details of the target are observable; in this case, the ideal target signature bandwidth is relatively large. For a target at the long range, the ideal target signature bandwidth is smaller. Two curves in FIG. 5b illustrate the bandwidths of the sensor and the ideal target signature. The wider one could be the bandwidth of the target or the sensor, or vise versa. The output bandwidth of the measured target signature is the minimum bandwidth of the ideal target signature and the sensor, that is, $$B_o=\min(B_f, B_s)$$

where $B_o$, $B_f$, and $B_s$ are the bandwidths of the output target signature, the ideal target signature and the sensor PSF, respectively. The proposed super-resolution image reconstruction algorithm cannot produce an image whose bandwidth exceeds $B_o$.

Suppose the measurement system stores the incoming images at the sample spacing of $\Delta_x$. The measured target signature, g(x), is then sampled at the integer multiples of $\Delta_x$, e.g., $x_n=n\Delta_x$, n=0, ±1, ±2, ..., ±N, to obtain the undersampled (aliased) image; the resultant can be modeled as the following delta-sampled signal in the spatial domain (see FIG. 5a):

$$g_\delta(x) = \sum_{n=-N}^{N} g(x)\delta(x-x_n) = g(x)\sum_{n=-N}^{N} \delta(x-x_n).$$

The Fourier transform of the above delta-sampled signal is $$G_\delta(k_x) = \frac{1}{\Delta_x}\sum_{l=-N}^{N} G\left(k_x - \frac{2\pi l}{\Delta_x}\right).$$

An acquired image is aliased when $$\Delta_x > \frac{2\pi}{B_o} \text{(Nyquist sample spacing)}.$$

As we mentioned earlier, many low resolution sensors possess a spatial sample spacing $\Delta_x$ that violates the Nyquist rate. The emphasis of the super-resolution image reconstruction algorithm in this invention is to de-alias a sequence of undersampled aliased images to obtain the alias-free or, as identified in the literature, a super-resolved image. We should emphasize again that the resolution of the output alias-free image is limited by the minimum bandwidth of the sensor and the ideal target signature.

One of the issues in super-resolution image reconstruction is the number of the undersampled images that are required to recover the alias-free image. Let the sampling space of the original undersampled images be $\Delta_x$. From an information-theory point of view, the sampling space of the output high-resolution image that is reconstructed from k frames (with distinct sub-pixel shifts) is $\Delta_x/k$ in one-dimensional imaging systems, and $(\Delta_x/\sqrt{k},\Delta_y/\sqrt{k})$ in two-dimensional imaging systems. Theoretically, more frames should provide more information and, thus, larger bandwidth and/or higher resolution. However, the super-resolution image quality does not improve when the number of processed undersampled images exceeds a certain value. This is due to the fact discussed above that the bandwidth recovery is limited by the minimum of the bandwidths of the sensor or ideal target signature.

Implementation of Error-Energy Reduction Algorithm

Figure 6:
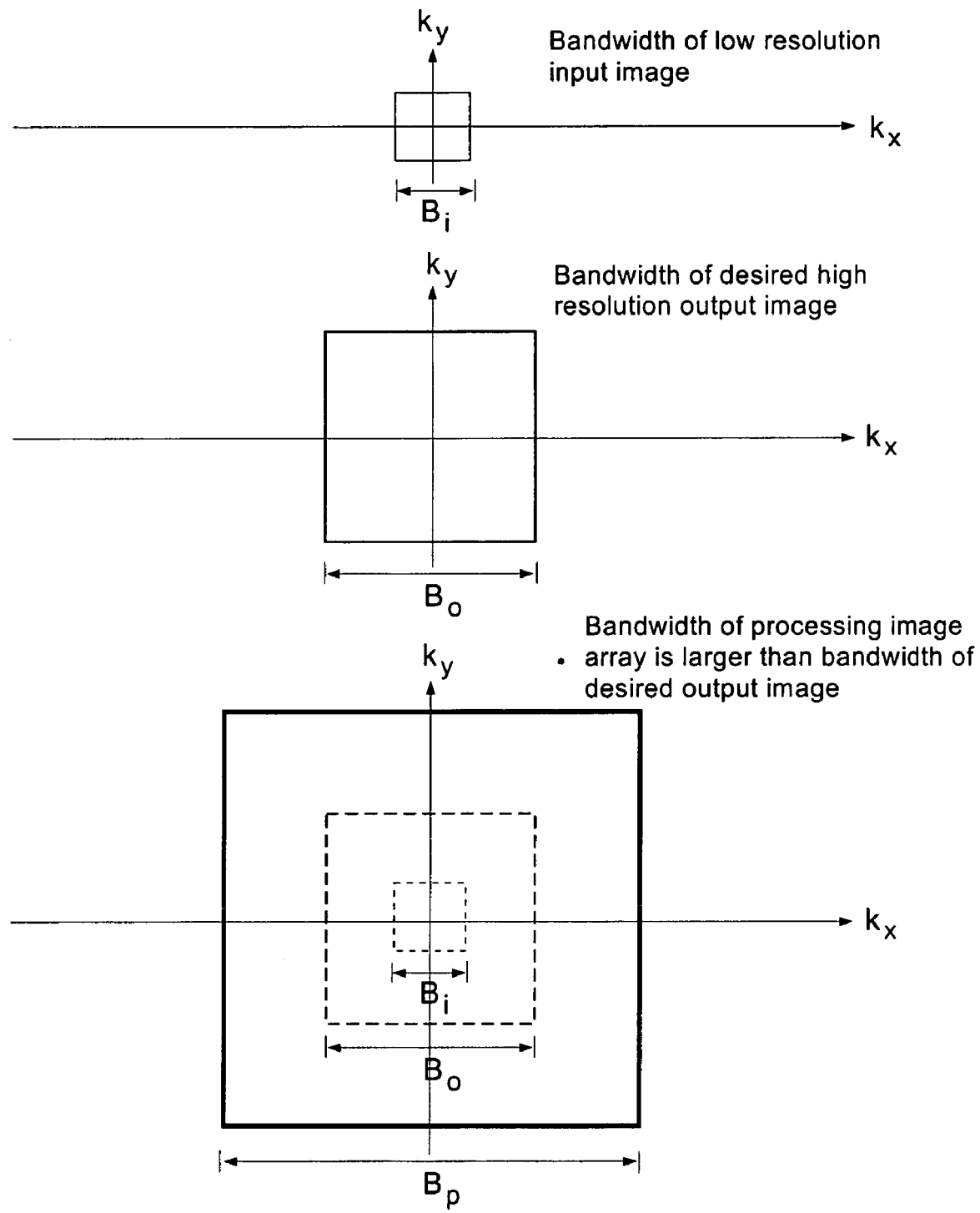
FIG. 6 is a graphic view showing the bandwidth phenomenon in the super-resolution image reconstruction algorithm.

Let the bandwidth of the input undersampled (aliased) images be $B_i$. The bandwidth of the alias-free (high-resolution) output image is denoted as $B_o$. In order to recover the desired (alias-free) bandwidth, it is important to select a processing array with a sample spacing smaller than the sample spacing of the desired high-resolution image. In this case, the 2D FFT of the processing array yields a spectral coverage, $B_p$, that is larger than the bandwidth of the output image. FIG. 6 illustrates this phenomenon in the 2D spatial frequency domain.

Let p(x,y) be the high-resolution alias-free image on the processing array (grid). The low-resolution (aliased) snap-shots only provide a sub-set of samples of this image. The location of each aliased image on the processing grid is dictated by its corresponding sub-pixel shifts in the (x,y) domain.

Figure 7A:
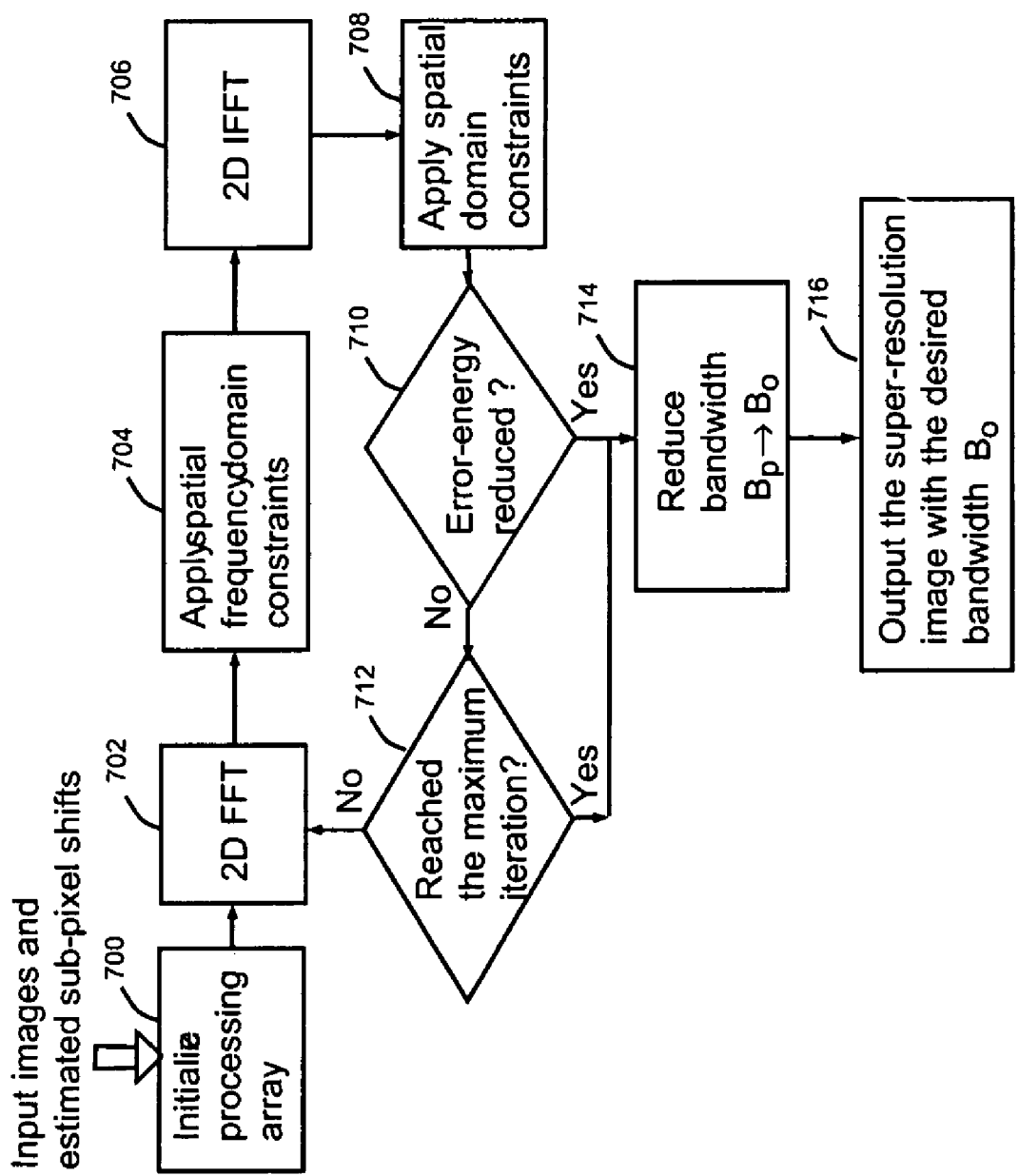
FIG. 7a is a block diagram of the error-energy reduction algorithm.

FIG. 7a shows a diagram of the error-energy reduction algorithm. In the first step, the processing array is initialized (box 700) by populating the grids using the input images according to the estimates of the sub-pixel shifts. In this procedure, the available image values (from multiple snap-shots) are assigned to each sub-pixel shifted grid location of the processing array. At the other grid locations of the processing array, zero values are assigned. This can be written as $$p_1(x, y) = \begin{cases} p(x, y), & (x, y) \in [X_p, Y_p] \\ 0, & \text{otherwise} \end{cases}$$

where $[X_p,Y_p]$ represents the set of grid locations where samples of the images are available from the alised/undersampled input images.

Then, we form the 2-D Fourier transform (box 702) $P_1(k_x, k_y)$ of this processing array. Its spectrum has a wider bandwidth than the true (desired) output bandwidth. Therefore, the spatial frequency domain constraint is applied (box 704), that is, replacing zeros outside the desired bandwidth. We form the function $$P_2(k_x,k_y) = P_1(k_x,k_y) \cdot W_p(k_x,k_y) \quad (2)$$

where $W_p(k_x,k_y)$ is a windowing function of realizing the spatial frequency domain constraint. The next step is to perform the inverse 2-D Fourier transform (box 706) $p_2(x,y)$ of the resultant array $P_2(k_x,k_y)$.

The resultant inverse array is not a true image because the image values at the known grid locations are not equal to the original image values. Then the spatial domain constraint is applied (box 708), that is, replacing those image values at the known grid locations with the known original image values. We obtain the function $$p_3(x, y) = \begin{cases} p(x, y), & (x, y) \in [X_p, Y_p] \\ p_2(x, y), & \text{otherwise} \end{cases} \quad (3)$$

We next form the Fourier transform $P_3(k_x,k_y)$ of $p_3(x,y)$. We apply the spatial frequency domain constraint to form the function $P_4(k_x,k_y)$ from $P_3(k_x,k_y)$ similar to the Eq. (2). Next, we compute the inverse Fourier transform $p_4(x,y)$, and apply the spatial domain constraint to form the function $p_5(x,y)$ from $p_4(x,y)$ and $p(x,y)$ similar to the Eq. (3). The procedure continues until the n th iteration.

The use of the available information in the spatial and spatial frequency domains results in a reduction of the energy of the error at each iteration step. At the odd steps of the iteration, the error is defined by $$e_{2n+1} = \sum_{(x,y) \in [X_p,Y_p]} [p_{2n+1}(x, y) - p(x, y)]^2.$$

In this invention, the condition of the error-energy reduction is examined (box 710) by defining the following ratio:

$$SNR_{2n+1} = 10\log_{10}\left(\frac{\sum_{(x,y) \in [X_p,Y_p]} [p(x, y)]^2}{\sum_{(x,y) \in [X_p,Y_p]} [p(x, y) - p_{2n+1}(x, y)]^2}\right). \quad (4)$$

If $SNR_{2n+1} < SNR_{max}$ (where $SNR_{max}$ is a pre-assigned threshold value), and the maximum iteration is not reached, the iteration continues. If $SNR_{2n+1} > SNR_{max}$, i.e., the stopping criterion is satisfied, the iteration is terminated. Before the final super-resolution image is generated, the bandwidth of the output image is reduced from $B_p$ to $B_o$ using the Fourier windowing method (see S. S. Young,"*Alias-free image sub-sampling using Fourier-based windowing methods,*" *Optical Engineering*, 43(4), 843-855, April 2004). Then the final super-resolution image with the desired alias-free bandwidth is saved for the output.

Figure 7B:
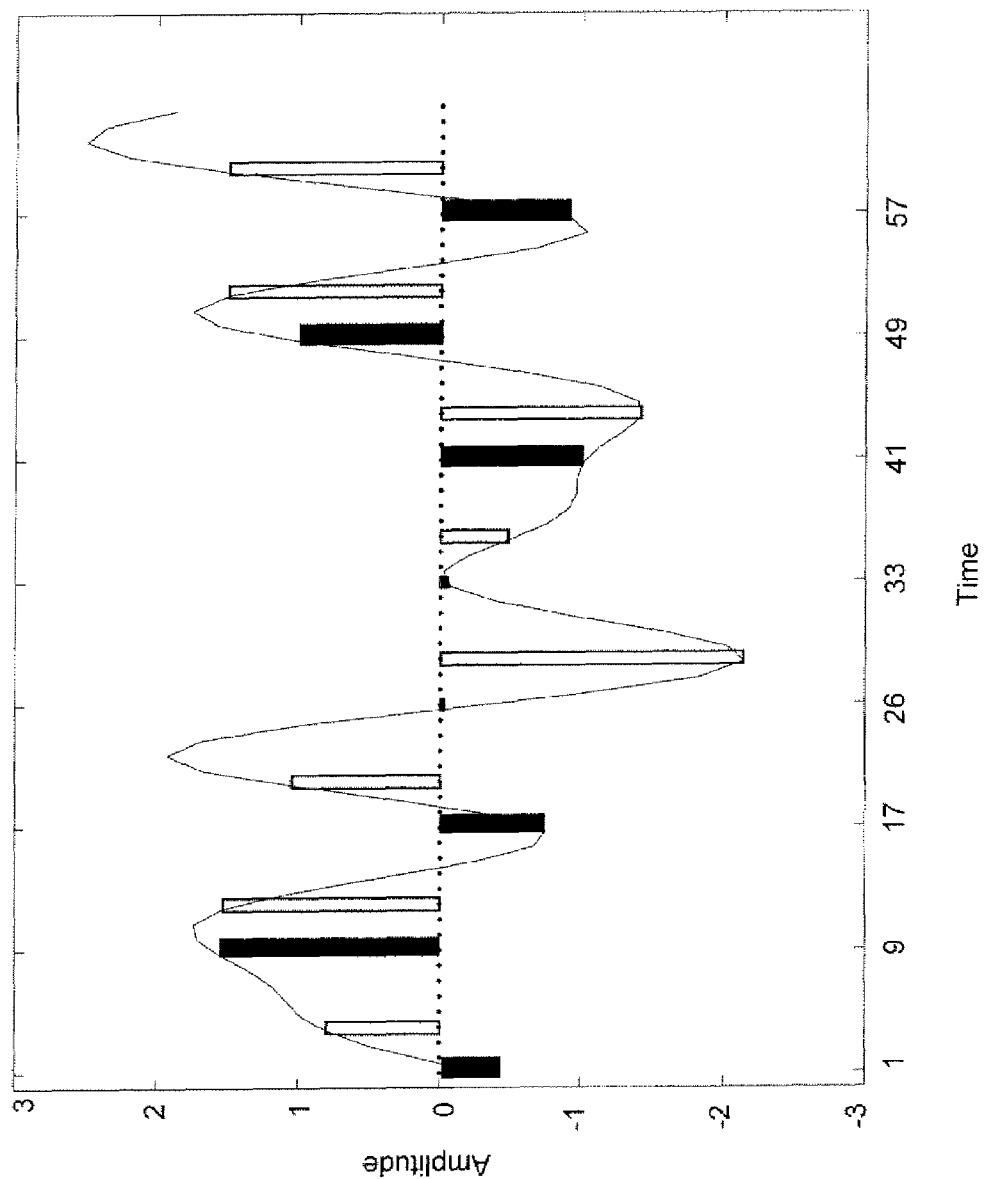
FIG. 7b is a graphic view showing an example of error-energy reduction algorithm for one-dimensional signals.

An illustration of the error-energy reduction algorithm for one-dimensional signal is shown in FIG. 7b. The original signal is plotted as the continuous solid line signal. The dots at the horizontal line are the grid sample locations for the big processing array. The big processing array has a sample spacing that is 8 times smaller than the original sample spacing in this example. There are two snap-shots. The samples from the first snap-shot (reference signal) are plotted as the dark wider bars and are at 1,9,17,25, . . . grid locations.

Figure 7C:
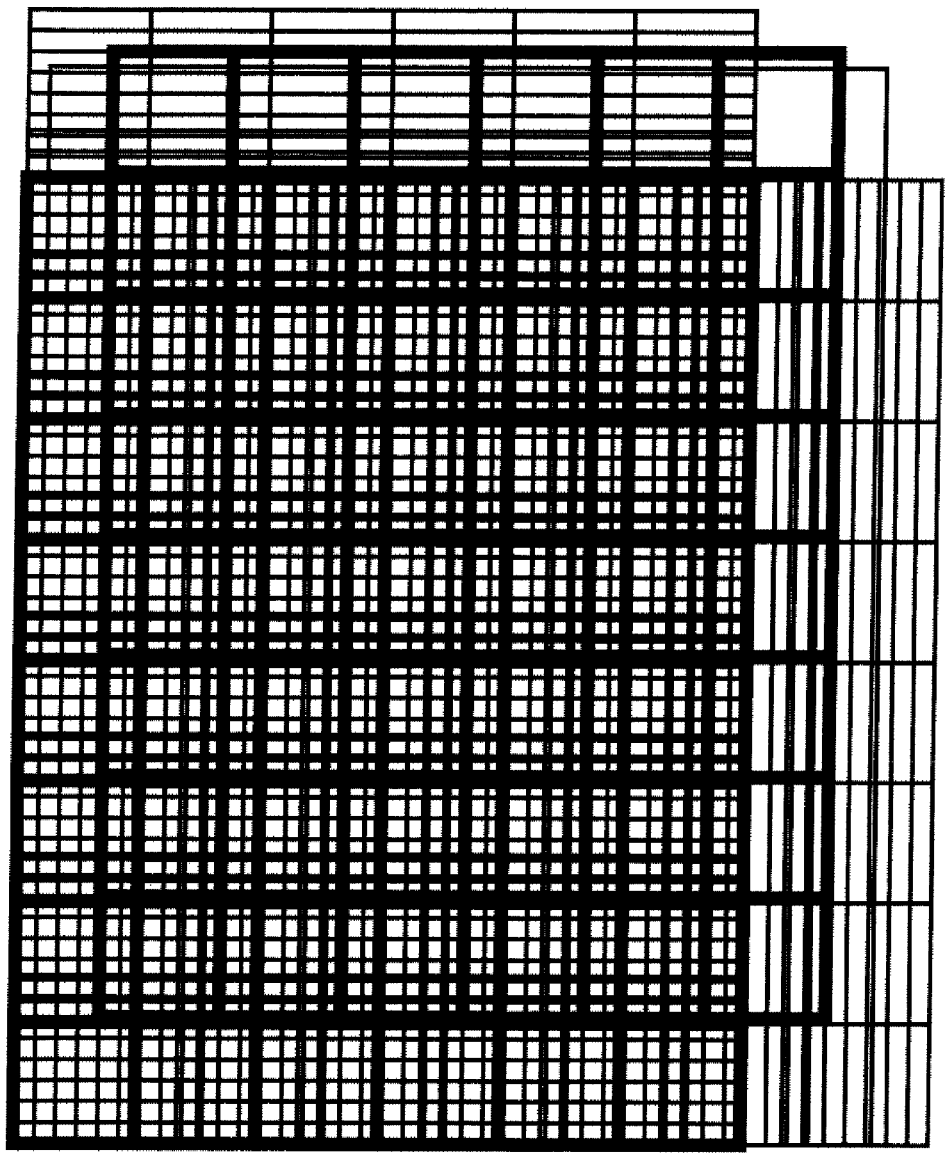
FIG. 7c is a graphic view showing a two-dimensional example of data coverage on the processing grid from two snap-shots.

There is no sub-pixel shift for this first snap-shot. The samples from the second snap-shot are plotted as the white narrow bars. They possess a relative sub-pixel shift of 3 with respect to the first snap-shot, and are at 4,12,20,28, . . . grid locations. The processing array is populated with the samples of these two snap-shots at 1,4,9,12,17,20,25,28, . . . grid locations. The other grid locations, i.e., 2,3,5,6,7,8,10,11, . . . are assigned to be zeros at the start of the algorithm. The iterative error-energy reduction algorithm is applied to this processing array by imposing spatial and spatial frequency domain constraints at each iteration step. When the iteration continues, the error-energy between the output signal and the original signal is reduced. When the algorithm converges, the high-resolution output signal is band limited and is reached to the original signal. FIG. 7c shows a two-dimensional example of data coverage on the processing grid from two snap-shots.

Figure 8:
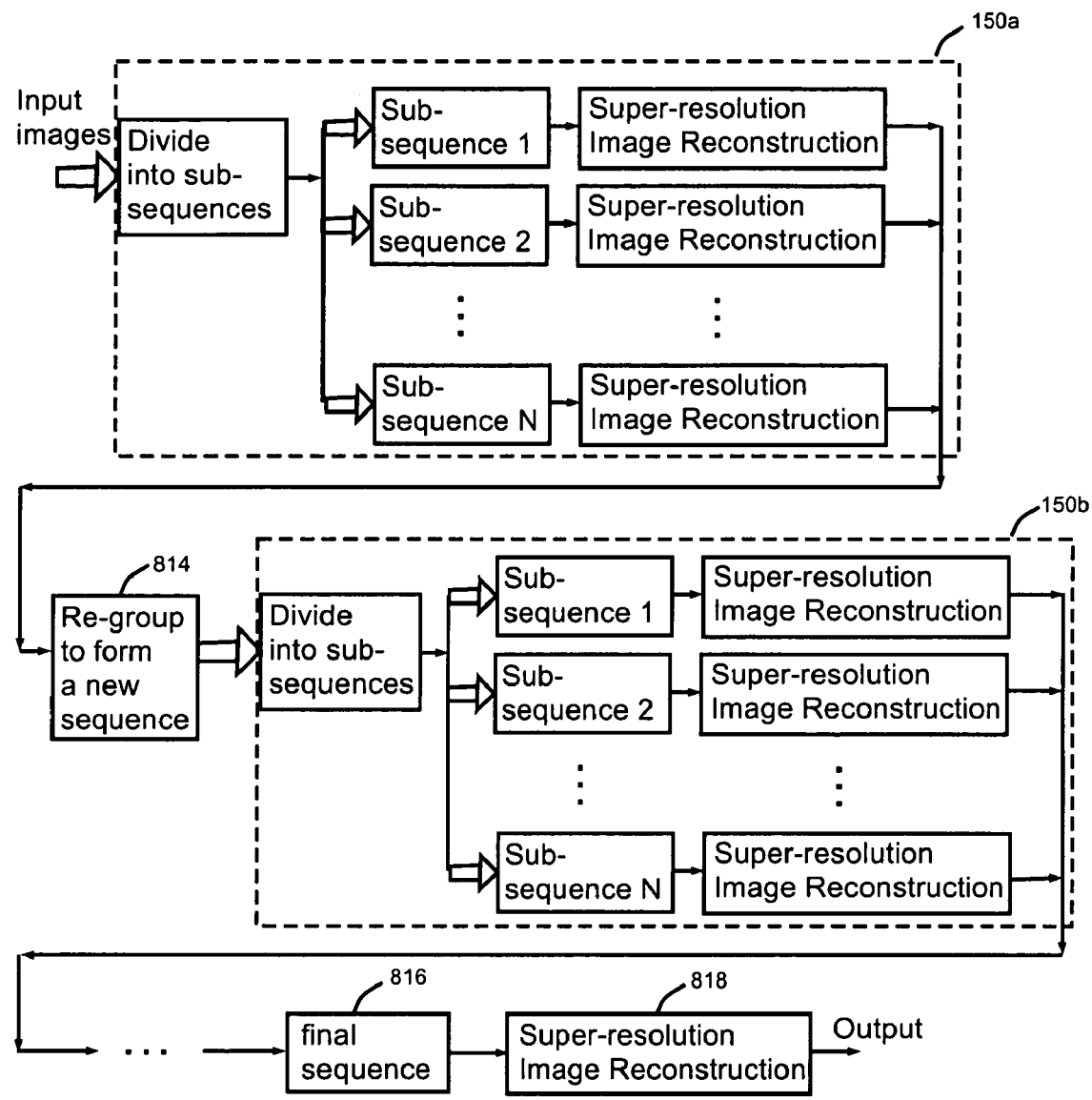
FIG. 8 is a block diagram of an alternative embodiment of the super-resolution image reconstruction algorithm that is implemented in a sequential manner.

In the present invention, the super-resolution image reconstruction can also be implemented in a sequential manner as shown an alternative embodiment in FIG. 8.

The input images are divided into sub-sequences first (box 150a). Each sub-sequence passes through the super-resolution image reconstruction algorithm to generate one output image. The images that are generated from all sub-sequences are then re-grouped to form a new sequence (box 814). Obviously, the number of images of this new sequence is less than the number of original input images. This new sequence is again divided into sub-sequences (box 150b).

This procedure repeats until a final output image reaches the desired resolution (box 816 and box 818).

The invention has been described in detail with particular reference to certain preferred embodiments thereof, but it will be understood that variations and modifications can be effected within the spirit and scope of the invention.

What is claimed is:

1. A method of super-resolving images comprising the steps of:
   a) inputting multiple undersampled low resolution input images of the same scene with unknown/known and irregular/regular sub-pixel shifts among images into an image processor;
   b) applying a gross shift estimation algorithm to the undersampled input low resolution images to obtain the overall shift of each image with respect to a reference image on the image processor;
   c) aligning the undersampled input images according to the gross shift estimates on the image processor;
   d) applying a sub-pixel shift estimation algorithm on the image processor to the aligned undersampled input images to obtain the sub-pixel shift of each image with respect to a reference image; and
   e) applying an error-energy reduction algorithm to the undersampled input low resolution images with the estimated sub-pixel shifts among images to produce a high-resolution (alias-free) output image from the image processor.

2. A method of super-resolving images on an image processor comprising the steps of:
   a) providing multiple low resolution input images of substantially the same scene with sub-pixel shifts among images;
   b) dividing the input images into sub-patches in the spatial domain, where each sub-patch contains multiple small images;
   c) for each sub-patch:
      i) applying a gross shift estimation algorithm to obtain an overall gross shift estimate for each small image with respect to a reference small image;
      ii) aligning the small images according to the gross shift estimate;
      iii) applying a sub-pixel shift estimation algorithm to the aligned small images to obtain the estimated sub-pixel shift of each small image with respect to the reference small image; and
      iv) applying an error-energy reduction algorithm to the small images with the estimated sub-pixel shifts to produce a high-resolution (substantially alias-free) sub-patch image; and
   d) combining all super-resolved sub-patch images to form a high-resolution output image.

3. The method of claim 2 wherein said step of applying a gross shift estimation algorithm to obtain the overall shift estimate for each small image with respect to a reference small image further includes the steps of:
   A) providing two input images, denoting the reference image to be the first input image and the selected image the second input image;
   B) applying the Fourier transform to the first input image;
   C) applying a low-passing windowing to the first Fourier transformed image to obtain the first low-pass windowed image;
   D) applying the Fourier transform to the second input image;
   E) applying a low-pass windowing to the second Fourier transformed image to obtain the second low-pass windowed image;
   F) obtaining the conjugate of the second low-pass windowed image;
   G) correlating the first low-pass windowed image with the second conjugated low-pass windowed image;
   H) applying the inverse Fourier transform to the said correlated image;
   I) finding the peak of the said inverse Fourier transformed correlated image; and
   J) outputting the peak as the spatial overall shift of the selected image with respect to the reference image.

4. A method of super-resolving images on an image processor comprising the steps of:
   a) providing multiple low resolution input images of the same scene with unknown/known and irregular/regular sub-pixel shifts among images;
   b) applying a gross shift estimation algorithm to the input low resolution images to obtain the overall shift of each image with respect to a reference image comprising the substeps of:
      i. providing two input images, denoting the reference image to be the first input image and the selected image the second input image;
      ii. applying the Fourier transform to the first input image;
      iii. applying the Fourier transform to the second input image;
      iv. obtaining the conjugate of the second Fourier transformed image;
      v. correlating the first Fourier transformed image with the second conjugated Fourier transformed image;
      vi. applying a low-pass windowing to the said correlated image to obtain the low-pass correlated image;
      vii. applying the inverse Fourier transform to the said low-pass correlated image to obtain the inverse correlated image;
      viii. finding the peak of the said inverse correlated image; and
      ix. outputting the peak as the spatial overall shift of the selected image with respect to the reference image
   c) aligning the input images according to the gross shift estimates;
   d) applying a sub-pixel shift estimation algorithm to the aligned input images to obtain the sub-pixel shift of each image with respect to a reference image; and
   e) applying an error-energy reduction algorithm to the input low resolution images with the estimated sub-pixel shifts among images to produce a high-resolution (alias-free) output image.

5. A method of super-resolving images on an image processor comprising the steps of:
   a) providing multiple low resolution input images of the same scene with unknown/known and irregular/regular sub-pixel shifts among images;

b) applying a gross shift estimation algorithm to the input low resolution images to obtain the overall shift of each image with respect to a reference image;
c) aligning the input images according to the gross shift estimates;
d) applying a sub-pixel shift estimation algorithm to the aligned input images to obtain the sub-pixel shift of each image with respect to a reference image comprising the substeps of
   i) providing two input low resolution images, denoting the reference image to be the first input image and the selected image the second input image;
   ii) applying the Fourier transform to the first image;
   iii) applying an upsample procedure to the first Fourier transformed image to obtain the first upsampled image;
   iv) applying the Fourier transform to the second image;
   v) applying an upsampling procedure to the second Fourier transformed image to obtain the second upsampled image;
   vi) obtaining the conjugate of the second upsampled image;
   vii) correlating the first upsampled image with the second conjugated upsampled image to obtain an upsampled correlated image;
   viii) applying a low-pass windowing to the upsampled correlated image to obtain a low-pass upsampled correlated image;
   ix) applying the inverse Fourier transform to the low-pass upsampled correlated image to obtain an inverse upsampled correlated image;
   x) finding the peak of the inverse upsampled correlated image; and
   xi) outputting the peak as the sub-pixel shift of the selected image with respect to the reference image; and
e) applying an error-energy reduction algorithm to the input low resolution images with the estimated sub-pixel shifts among images to produce a high-resolution (alias-free) output image.

6. The method of claim 2 wherein said step of applying a sub-pixel shift estimation algorithm to obtain the estimated sub-pixel shift of each small image with respect to the reference small image further includes the steps of:
   A) providing two input low resolution images, denoting the reference image to be the first input image and the selected image the second input image;
   B) applying the Fourier transform to the first image;
   C) applying the Fourier transform to the second image;
   D) obtaining the conjugate of the second Fourier transformed image;
   E) correlating the first Fourier transformed image with the second conjugated Fourier transformed image to obtain the correlated image;
   F) applying a upsampling procedure to the said correlated image to obtain the upsampled correlated image;
   G) applying a low-pass windowing to the said upsampled correlated image to obtain the low-pass upsampled correlated image;
   H) applying the inverse Fourier transform to the said low-pass upsampled correlated image to obtain the inverse upsampled correlated image;
   I) finding the peak of the said inverse upsampled correlated image; and
   J) outputting the peak as the sub-pixel shift of the selected image with respect to the reference image.

7. A method of super-resolving images on an image processor comprising the steps of:
   a) providing multiple low resolution input images of the same scene with unknown/known and irregular/regular sub-pixel shifts among images;
   b) applying a gross shift estimation algorithm to the input low resolution images to obtain the overall shift of each image with respect to a reference image;
   c) aligning the input images according to the gross shift estimates;
   d) applying a sub-pixel shift estimation algorithm to the aligned input images to obtain the sub-pixel shift of each image with respect to a reference image; and
   e) applying an error-energy reduction algorithm to the input low resolution images with the estimated sub-pixel shifts among images to produce a high-resolution (alias-free) output image, wherein said step of applying an error-energy reduction algorithm further includes the steps of:
      i) initializing a processing array by populating the grids using the input image values and sub-pixel shift estimates; ii) applying the 2D Fourier transform to the said processing array;
      iii) applying spatial frequency domain constraints to the Fourier transformed processing array to obtain the constrained spatial frequency domain processing array;
      iv) applying the inverse 2D Fourier transform to the constrained spatial frequency domain processing array to obtain the inverse processing array;
      v) applying spatial domain constraints to the inverse processing array to obtain the constrained spatial domain processing array;
      vi) checking the error-energy reduction condition;
      vii) if the stopping criterion is not satisfied, going back to the step of applying the 2D Fourier transform;
      viii) if the stopping criterion is satisfied, going to the next step; ix) reducing the bandwidth from the processing array to the desired output array; and
      x) outputting the super-resolved image with the desired bandwidth.

8. The method of claim 7 wherein said step of initializing a processing array further includes the steps of:
   A) providing input low resolution images;
   B) providing the estimated sub-pixel shift of each image with respect to a reference image;
   C) generating a 2D processing array with a sample spacing smaller than one of the desired high-resolution output image, that is, a 2D processing array with a larger size than the desired high-resolution output image;
   D) assigning the known image values to each sub-pixel shifted grid location of the processing array; and
   E) assigning zeros to other grid locations.

9. The method of claim 7 wherein said step of applying spatial frequency domain constraints further includes the steps of:
   A) replacing zeros outside the desired bandwidth; and
   B) applying a window function to avoid ripple effect.

10. The method of claim 7 wherein said step of applying spatial domain constraints further includes the steps of:
   A) replacing image values at known grid locations of the processing array with the known original low resolution image values; and
   B) keeping image values at other grid locations of the processing array.

11. The method of claim 7 wherein said step of checking the error-energy reduction condition further includes the steps of:
- A) defining an error-energy using the constrained spatial domain processing array; and
- B) checking if the error-energy is less than a threshold.

12. A method of super-resolution reconstruction on an image processor that includes the following steps in the following order:
- a) providing multiple low resolution input images with sub-pixel shifts among images;
- b) dividing input images into sub-sequences;
- c) for each sub-sequence, applying a super-resolution image reconstruction algorithm to generate a high-resolution (alias-free) output image;
- d) re-group the output images to form a new sequence;
- e) dividing the new sequence into sub-sequences;
- f) for each new sub-sequence, applying the super-resolution image reconstruction algorithm to generate a high-resolution (alias-free) output image;
- g) checking if the resolution of the desired output image is reached;
- h) if the resolution of the desired output image is not reached, going to the step of re-group the said output images to form a new sequence; and
- i) if the resolution of the desired output image is reached, outputting the desired high-resolution output image.

13. A method of resolving images taken by a camera subjected to uncontrolled movement, comprising:
- inputting frames of low resolution images of a scene into a processor; at least one of the frames being affected by uncontrolled movement of the camera;
- estimating the sub-pixel shift among the image frames due to the movement of the camera using the processor;
- applying an error-energy reduction algorithm using the processor to the low-resolution input images utilizing the estimated sub-pixel shift to obtain a high-resolution output image.

14. The method of claim 13 wherein the high resolution output is either a single high resolution image that is generated from a collective sequence of low-resolution images, or a sequence of high-resolution images such as in a video sequence that are generated from multiple sequences of low resolution images.

15. The method of claim 13, wherein the step of estimating the sub-pixel shift utilizes a gross shift estimation algorithm to estimate the overall shift of each frame with respect to a reference frame; the images of successive frames containing not only sub-pixel shifts but also integer pixel shifts; the gross shifts among frames being compensated for by realigning the input images; and estimating the sub-pixel shifts for each frame with respect to a reference frame.

16. The method of claim 13 further comprising the steps of:
- utilizing a correlation method to estimate sub-pixel shifts among the frames of the image; and
- using the location of each low-resolution image in an upsampled grid in an iterative error-energy reduction algorithm to reconstruct the high-resolution image, the error-energy algorithm utilizing the knowledge of samples of aliased images and their locations on the upsampled array as the spatial domain constraint and the bandwidth as the spatial frequency domain constraint.

17. The method of claim 13 further comprising treating the spatial samples from low-resolution images as a set of constraints to populate an oversampled processing array which is sampled above the desired output bandwidth, whereby the estimated sub-pixel locations of these samples and their values constitute a spatial domain constraint and the bandwidth of the alias free image is the criterion used as a spatial frequency domain constraint on the oversampled processing array.

18. The method of claim 13 wherein the spatial domain constraint of the iterative error-energy reduction algorithm is the estimated sub-pixel locations of these samples and their values and spatial frequency domain constraint of the iterative error-energy reduction algorithm is the bandwidth.

19. The method of claim 13 wherein the step of estimating the sub-pixel shift among the image frames comprises:
- i) upsampling the low resolution images by zero padding the Fourier transform of each low resolution image; the upsampling rate being chosen to form a grid having a larger size than the original image;
- ii) correlating two upsampled low resolution images, the location of the peak of the correlation in the spatial domain identifying the relative shift in the upsampled grid from the original image; and
- iii) forming a basis of an iterative error-energy reduction algorithm from the estimated sub-pixel locations of each low-resolution image in the upsampled grid to reconstruct the high-resolution (alias-free) image.

20. The method of claim 1 wherein the step of applying a gross shift estimation algorithm to the input low resolution images to obtain the overall shift of each image with respect to a reference image comprises utilizing a Fourier-based correlation method to explore the translational differences of Fourier transforms of at least two images.

* * * * *